(12) United States Patent
McDaniel et al.

(10) Patent No.: US 12,095,824 B2
(45) Date of Patent: Sep. 17, 2024

(54) AUTHENTICATION BASED ON DETECTION OF USER-SPECIFIC AUTHENTICATION INPUT ERRORS

(71) Applicant: Capital One Services, LLC, McLean, VA (US)

(72) Inventors: Christopher McDaniel, Glen Allen, VA (US); Michael Anthony Young, Jr., Henrico, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 17/822,228

(22) Filed: Aug. 25, 2022

(65) Prior Publication Data

US 2024/0073250 A1  Feb. 29, 2024

(51) Int. Cl.
*H04L 9/40* (2022.01)
(52) U.S. Cl.
CPC .......... *H04L 63/205* (2013.01); *H04L 63/083* (2013.01)

(58) Field of Classification Search
CPC .......................... H04L 63/205; H04L 63/083
See application file for complete search history.

(56) References Cited

U.S. PATENT DOCUMENTS

| | | | |
|---|---|---|---|
| 10,846,385 B1* | 11/2020 | Walters | G06F 21/40 |
| 2019/0356679 A1* | 11/2019 | Sites | H04L 63/1416 |
| 2021/0110013 A1* | 4/2021 | Walters | G06F 21/316 |
| 2022/0139546 A1* | 5/2022 | Manjunath | H04L 9/3231 |
| | | | 705/2 |
| 2023/0224325 A1* | 7/2023 | Mautone | H04L 63/1466 |
| | | | 726/22 |

* cited by examiner

*Primary Examiner* — Normin Abedin
(74) *Attorney, Agent, or Firm* — Foley & Lardner LLP

(57) ABSTRACT

In some embodiments, a computing system may monitor authentication input and modify authentication requirements based on detection of user-specific input errors. The computing system may use machine learning or other techniques to detect whether an incorrect authentication input corresponds to a common input mistake of a user. If the incorrect authentication input does correspond to a common input mistake of the user, a computing system may modify one or more authentication requirements to make the authentication process easier for the user.

20 Claims, 5 Drawing Sheets

200

| Incorrect Password | Correct Password | Label |
|---|---|---|
| mien | mine | 0 |
| answor | answer | 1 |
| fascinare | fascinate | 0 |

FIG. 2

AUTHENTICATION BASED ON DETECTION OF USER-SPECIFIC AUTHENTICATION INPUT ERRORS

BACKGROUND

A password is a string of characters used to verify the identity of a user during the authentication process. Passwords are typically used in tandem with a username, and they are designed to be known only to the user and allow that user to gain access to a device, application, or website. Passwords can vary in length and can contain letters, numbers, and special characters.

In some authentication processes, a password is converted into a string of characters called a hash. The hash is then compared to a hash associated with the user and stored in a database. If the hashes match, a user may be authenticated or granted access to an account. A one-way function is often used to generate the hashes. The one-way function typically takes a password as input and transforms it into a hash that includes a different string of characters with a set length. Unlike other techniques that can encrypt and decrypt data, hashing is difficult to revert. Thus, if malicious actors get ahold of a database with hashed passwords, hash decoding is a difficult task. However, some malicious attackers still attempt to find passwords that were used to generate a hash. To do this, malicious actors may employ attacks that involve systematically hashing words, phrases, and their variations to determine whether any of the hashes match hashes stolen from a database. If a hash generated by the malicious actor matches a stolen hash, then the malicious actor will know the word used to generate the hash is the corresponding user's password.

To provide additional security, a number of computing systems offer multi-factor authentication (MFA). Two-factor authentication (2FA) is a specific type of MFA that strengthens access security by requiring two methods (also referred to as authentication factors) to verify a user's identity. These factors can include something a user knows (e.g., a username and password), something a user has (e.g., a smartphone, a smartphone app, etc.), or something a user is (e.g., a fingerprint or other biometric information) to approve authentication requests. Using MFA may help protect against phishing, social engineering, password brute-force attacks or other attacks malicious actors may use to gain access to a system.

SUMMARY

Existing systems often require a user to authenticate the user's identity by entering a password and a username. To guard against the systematic attacks described above, systems may require the password to include more than a threshold number of letters, numbers, and/or special characters. This makes it harder for a malicious actor to determine the password because the longer the password, the more time it requires to try every combination of characters. However, requiring long, complicated passwords may create a problem in that they are hard for users to input. For example, a user may make a typing mistake when entering in the user's password. When the system rejects the authentication attempt, the user may need to type in the password all over again. In some cases, the user may struggle to enter in a password and then be frustrated with a requirement for multi-factor authentication, which further increases the burden on the user.

Additionally, in many cases, with respect to a failed attempt to authenticate, existing systems generally cannot accurately assess whether the authentication input was entered by the true user (e.g., the owner of an account) or whether a malicious actor is responsible for the failed attempt. This makes it more difficult for cybersecurity intrusions to be detected by the computing system. Without the ability to determine whether a failed login attempt came from a malicious actor, the computing system may not be able to respond as quickly as it otherwise might to deny access to the system and prevent further damage from a cyber security attack.

To address the issues described above, methods and systems described herein may monitor authentication input and modify authentication requirements based on detection of user-specific input errors. In some embodiments, methods and systems described herein may use machine learning or other techniques to detect whether an incorrect authentication input corresponds to a common input mistake of a user (e.g., the owner of an account). If the incorrect authentication input does correspond to a common input mistake of the user, a computing system may modify one or more authentication requirements to make the authentication process easier for the user. Because the system recognizes the incorrect authentication input as being one that the user is likely to make, the system has assurance that the user is who the user is claiming to be. To perform the above, methods and systems described herein may generate, via a machine learning model, output indicating whether an incorrect password is a common typing error of the user, and, based on the output indicating that the incorrect password is a common typing error of the user, the computing system may modify a login requirement associated with the user.

In some embodiments, a computing system may detect a password field has input focus of a user device associated with a user (e.g., the password field is the input field with which the user is currently interacting). Based on detecting that the password field has input focus, the computing system may monitor the password field for input of the user. The computing system may determine, based on monitoring the password field, that the input is an incorrect password of the user. The computing system may input the incorrect password into a machine learning model that has been trained on a dataset comprising typing errors made by a plurality of other users and typing errors made by the user. The computing system may generate, via the machine learning model, output indicating whether the incorrect password is a common typing error of the user. Based on the output indicating that the incorrect password is a common typing error of the user, the computing system may modify a login requirement associated with the user by temporarily increasing a number of failed attempts that are allowed for password entry for the user.

In some embodiments, a computing system may obtain a plurality of incorrect authentication inputs corresponding to a user of a user device. Each incorrect authentication input may include a typing error associated with the user or other input error associated with the user (e.g., audible input error, touch input error, etc.). The computing system may generate, based on the incorrect authentication inputs, a plurality of hashes. Each hash of the plurality of hashes may correspond to an incorrect authentication input of the plurality of incorrect authentication inputs. The computing system may determine that the authentication input includes an input error. Based on determining that the authentication input includes an input error, the computing system may determine whether a hash corresponding to the authentication input matches a hash of the plurality of hashes. Based on the hash corresponding to the authentication input matching the hash of the plurality of hashes, the computing system may modify a login requirement associated with the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows example training data for a machine learning model, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
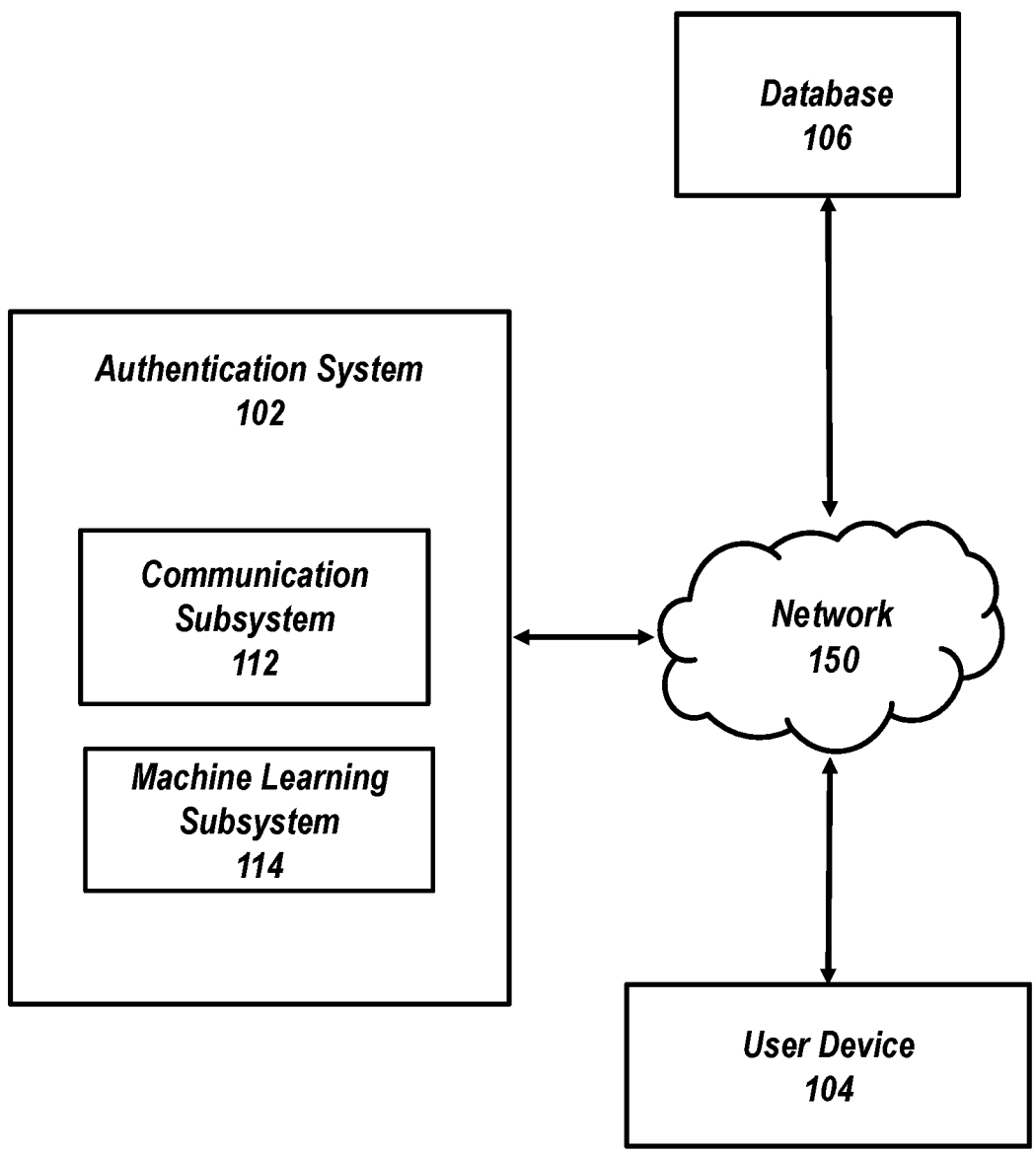
FIG. 1 shows an illustrative diagram for modifying authentication requirements based on detection of user-specific authentication input errors, in accordance with one or more embodiments.

FIG. 1 shows an example system 100 for modifying authentication requirements based on detection of user-specific authentication input errors, in accordance with one or more embodiments. The system 100 may include an authentication system 102, a database 106, a user device 104, or other components. The authentication system 102 may include a communication subsystem 112, a machine learning subsystem 114, or other components. Each of the authentication system 102, the database 106, and/or the user device 104 may be a variety of computing devices (e.g., physical or virtual) including a server, a virtual machine, a desktop, a mobile device (e.g., a smartphone) or any other device or component described below in connection with FIGS. 2-4. It should be noted that, while one or more operations are described herein as being performed by particular components of authentication system 102, those operations may, in some embodiments, be performed by other components of authentication system 102 or other components of system 100. As an example, while one or more operations are described herein as being performed by components of authentication system 102, those operations may, in some embodiments, be performed by components of user device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

In some embodiments, the authentication system 102 may detect whether an incorrect authentication input was made by a first user (or determine that the incorrect authentication was not made by a malicious user). For example, the authentication system 102 may detect whether the input was made by the first user via a machine learning model, via comparison with one or more values (e.g., hash values), or via a variety of other techniques. If the incorrect authentication input corresponds to an input mistake made by the first user in the past, a computing system may modify one or more authentication requirements to make the authentication process easier for the first user. The authentication system 102 may generate output indicating whether an incorrect authentication input is an input error of the first user, and, based on the output indicating that the incorrect authentication input is an input error of the first user, the computing system may modify an authentication requirement associated with the first user.

In some embodiments, the authentication system 102 may determine, based on monitoring authentication input, an incorrect authentication input associated with a user. Authentication input may be any information, entered at a device by a user, that is intended to authenticate the user. For example, authentication input may include typing a username or password, entering a security pin or other code, answering a security question, providing biometric information (e.g., fingerprint, retina scan, etc.), or a variety of other authentication inputs. Authentication input may be entered (e.g., at the user device 104) via a keyboard, mouse, gamepad, remote controller, touchscreen, or other control device.

Authentication input may be entered by a true user or a malicious user. The authentication system 102 may attempt to determine whether input was entered by a true user. As used herein, a true user may include a user that is authorized to access a computing system, an account, a physical location, or variety of other objects/information. The true user may be required to authenticate in order to be granted access. A malicious user may be a user that tries to gain unauthorized access. A malicious user may try to steal or otherwise obtain authentication credentials (e.g., passwords, codes, etc.) from a true user or other source to authenticate and gain access to a computing system, a location, or a variety of other objects/information.

The authentication system 102 may monitor authentication input. For example, after a user begins entering authentication input at a device (e.g., the user device 104), the device may send the input to the authentication system 102. The authentication system 102 may receive the input via the communication subsystem 112. In some embodiments, the device may send an indication that the user has begun to enter authentication input at the device. For example, the device may detect when a password field has focus for an input device (e.g., keyboard, mouse, etc.). The device may send a message to the authentication system 102 indicating that the password field has focus.

The authentication system 102 may input the incorrect authentication input into a machine learning model that has been trained on a dataset comprising user input errors associated with the user. For example, referring to FIG. 2, an example dataset 200 is shown. The dataset 200 may include input entered by a user (e.g., a true user, a malicious user, etc.). The dataset 200 may include a plurality of rows. Each row may include an incorrect password that has been previously input by a user, a corresponding correct password, and a label indicating the user that entered the incorrect password. The machine learning subsystem 114 may use the dataset 200 to train a machine learning model to classify incorrect authentication input. The machine learning model may classify input by identifying a user to whom the input corresponds. For example, output of the machine learning model may indicate an identification of a user. In some embodiments, output of the machine learning model may be binary. For example, the output may indicate whether the incorrect authentication input was entered by the true user.

In some embodiments, the authentication system 102 (e.g., via the machine learning subsystem 114) may preprocess a portion of the data in a dataset. For example, the authentication system 102 may determine a representation of the difference between the incorrect passwords entered by the user and the correct password. The representation of the difference may include an indication of what incorrect characters were input and their locations. For example, if the correct password is "answer" and the incorrect authentication input was "answor," then the authentication system 102 may generate an additional column that includes an indication that an "o" replaced an "e" in the fifth character of the password. Additionally or alternatively, the authentication system 102 may generate an additional column that indicates that an "o" was used in place of an "e" when the user attempted to enter the user's password.

The authentication system 102 may generate, via the machine learning model, output indicating whether the incorrect authentication input is a common user input error for the user. A common user input error may be an input error that a user has made more than a threshold percentage of times. A common user input error may include a typing error or an error that is entered via a keyboard, mouse, gamepad, remote controller, touchscreen, or other control device. An input error may include an audible input error. For example, the audible input error may include a user speaking an incorrect word, an incorrect character, mispronouncing a word or character, playing an incorrect note, making an incorrect sound, or a variety of other audible input errors. An input error may include a touch input error. For example, the user may touch an incorrect object on a touchscreen or other input device. An input error may include entering the wrong character in a password, entering characters or other input out of order, or a variety of other errors.

In some embodiments, the machine learning model may classify an incorrect authentication input as a common user input error. For example, the machine learning model may output a binary value that is 0 when the incorrect authentication input is not classified as a common user input error and that is 1 when the incorrect authentication input is classified as a common user input error. Based on the output indicating that the incorrect authentication input is a common user input error for the user, the authentication system 102 may modify an authentication requirement associated with the user. An authentication requirement may be any information or action that may be required for verifying that a user is authorized to access information, a computing system, and/or a location (e.g., a room, a building, etc.). For example, an authentication requirement may include entering a password and username, entering a code or pin number, answering one or more security questions, verifying identity via multi-factor authentication, entering biometric information, or a variety of other authentication requirements.

In some embodiments, the authentication system 102 may obtain a plurality of incorrect authentication inputs corresponding to a user of a user device. The incorrect authentication inputs may be obtained over a time period. For example, each time a user enters an incorrect authentication input at the user device, the incorrect authentication input (or a representation of the incorrect authentication input) may be sent to the authentication system 102. Each incorrect authentication input of the plurality of incorrect authentication inputs may be treated as a common input (e.g., typing) error of the user as described above.

The authentication system 102 may generate, based on the plurality of incorrect authentication inputs, a plurality of hashes or other cryptographic representations corresponding to the incorrect authentication inputs. A hash may include a value (e.g., comprising letters, numbers, and/or other characters) that is produced as an output when an incorrect authentication input or a portion of an incorrect authentication input is entered into a function or set of functions. A hash may be generated via BLAKE3, Whirlpool, SHA, Bcrypt, RIPEMD-160, AES Encrypt, GOST, CRC-64, Blowfish, Twofish, or a variety of other hashing functions. Each hash of the plurality of hashes may correspond to an incorrect authentication input of the plurality of incorrect authentication inputs.

The authentication system 102 may determine, based on authentication input associated with the user, that the authentication input comprises an input error. Based on determining that the authentication input comprises an input error, the authentication system 102 may determine whether a hash corresponding to the authentication input matches a hash of the plurality of hashes. For example, by comparing a hash of the authentication input with the plurality of hashes, the authentication system 102 may determine that the authentication input is a common input error of the user or that the authentication input was made by a true user (e.g., the user that owns the account for which the authentication input was made). Based on the two hashes matching (e.g., the hash corresponding to the authentication input and the hash of the plurality of hashes), the authentication system 102 may modify an authentication requirement associated with the user.

Figure 3:
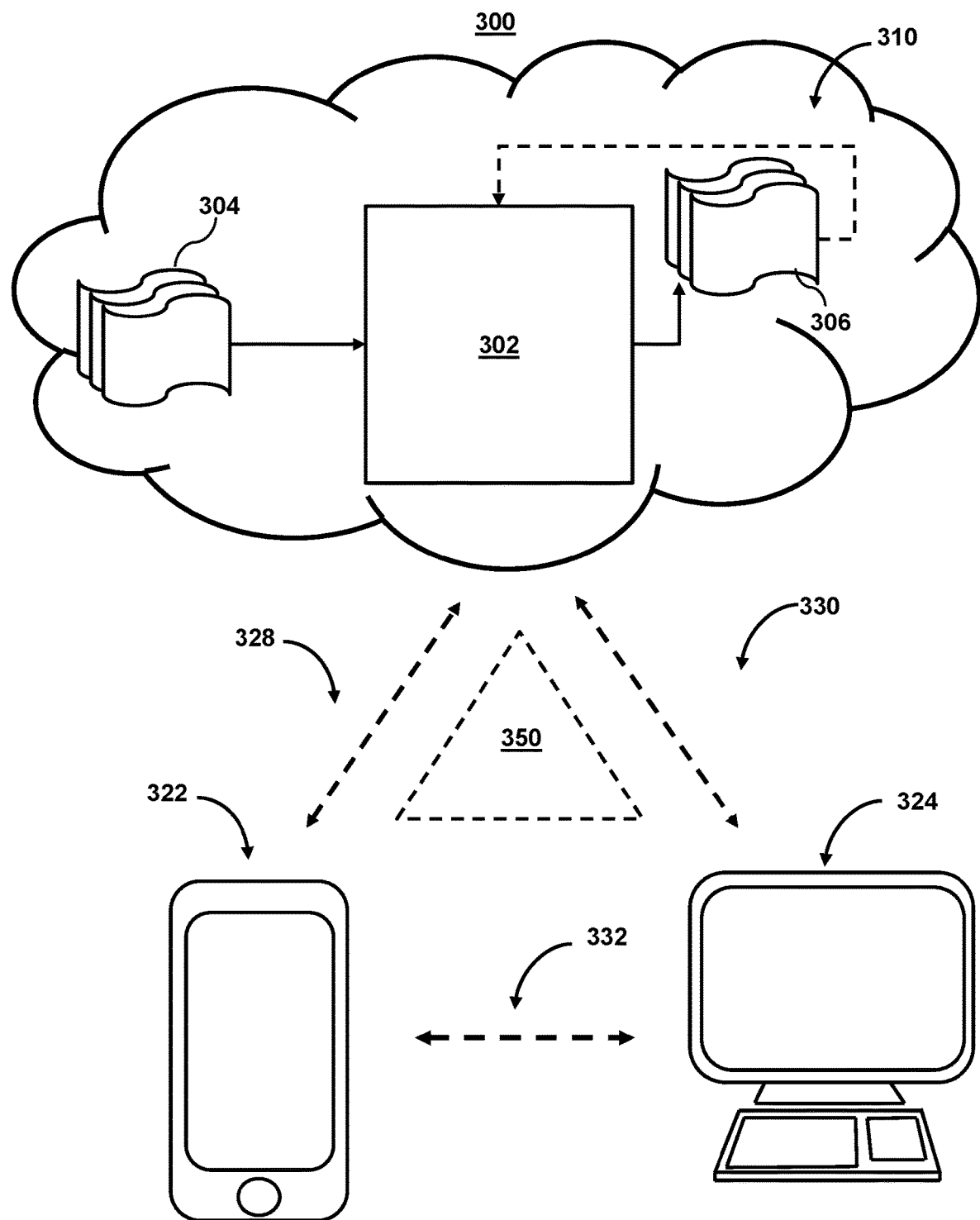
FIG. 3 shows illustrative components for a system used to detect user-specific authentication input errors, in accordance with one or more embodiments.

FIG. 3 shows illustrative components for a system used to determine whether incorrect authentication input was made by a true user or a malicious user, in accordance with one or more embodiments. For example, FIG. 3 may show illustrative components for use in machine learning or other techniques to detect whether an incorrect authentication input corresponds to a common input mistake of a user. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may in some embodiments be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., Internet Protocol television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the authentication system 102, the database 106, the user device 104, or any other device/component described above.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known classification for the first labeled feature input. The system may then train the first machine learning model to classify the first labeled feature input with the known classification (e.g., whether an incorrect authentication input corresponds to a true user, whether an incorrect authentication input is a common typing mistake of a user, or any other classification described above in connection with FIGS. 1-2).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether an incorrect authentication input corresponds to a true user, whether an incorrect authentication input is a common typing mistake of a user, or any other classification described above in connection with FIGS. 1-2).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A representational state transfer (REST) or Web services API layer) may provide a decoupled interface to data and/or functionality of one or more applications. API layer 350 may provide a common, language-agnostic way of interacting with an application. Web services APIs offer a well-defined contract called web services description language (WSDL) that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
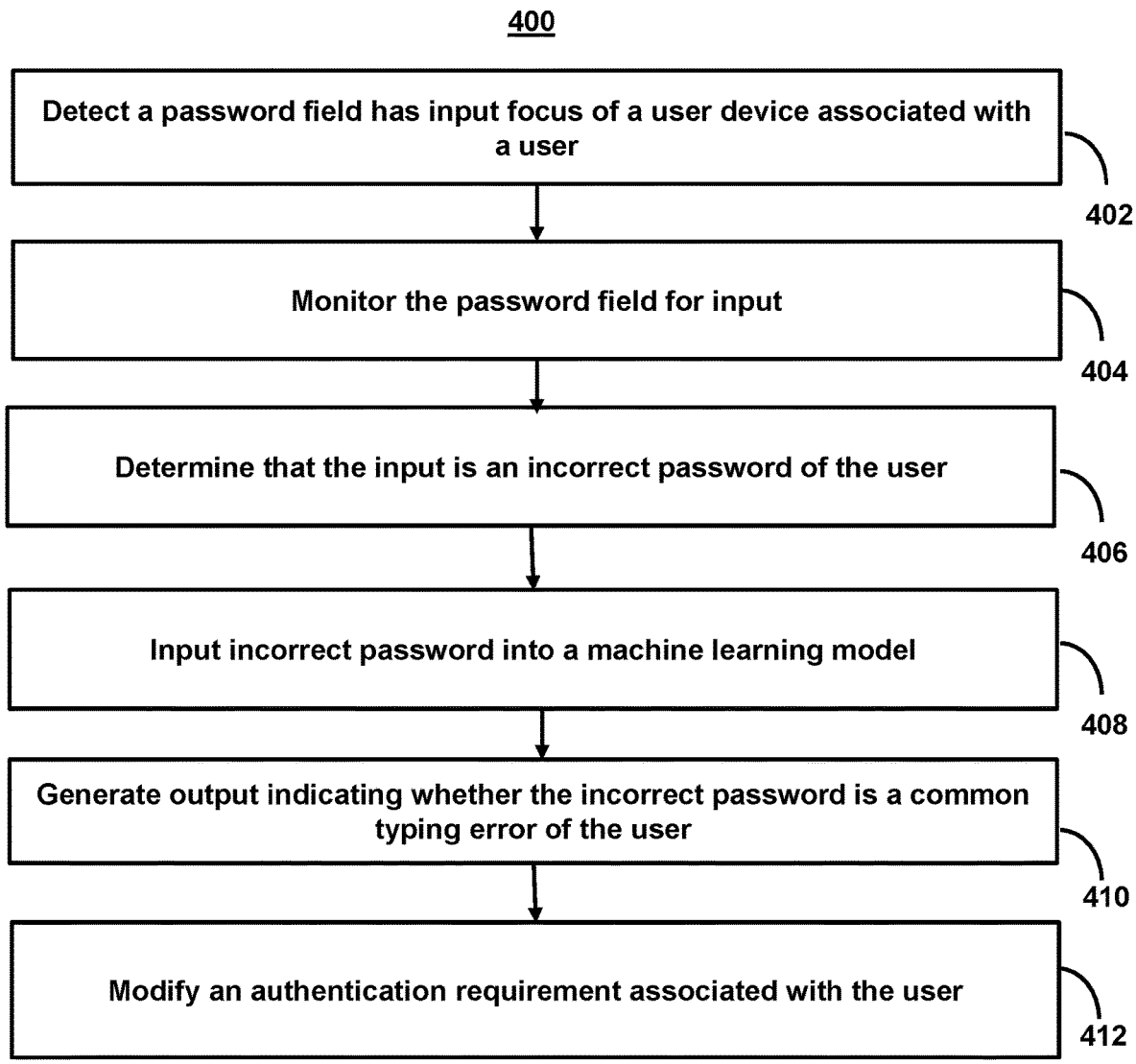
FIG. 4 shows a flowchart of the steps involved in monitoring password entry and modifying authentication requirements based on detection of user-specific authentication input errors, in accordance with one or more embodiments.

FIG. 4 shows a flowchart of the steps involved in monitoring password entry and modifying authentication requirements based on detection of user-specific authentication input errors, in accordance with one or more embodiments. For example, the system may use process 400 (e.g., as implemented on one or more system components described above) in order to reduce false positives for cyber intrusion detection systems and to provide a better user experience. Any of the steps described below may be performed using one or more components described above.

At step 402, the authentication system 102 may detect that a password field has input focus of a user device associated with a user. For example, the authentication system 102 may determine that a user has selected a password field on the user device 104 so that the user can enter a password. In this example, a website displayed on the user device 104 may send to the authentication system 102 an indication that a password field has been selected by the user.

At step 404, the authentication system 102 may monitor the password field for input. For example, the user device 104 may detect input at the password field and may send an indication that input was detected to the authentication system 102. The monitoring may be performed based on detecting that the password field has input focus.

At step 406, the authentication system 102 may determine that the input detected at step 404 is incorrect. For example, the authentication system 102 may determine, based on monitoring the password field, that the input is an incorrect password of the user.

At step 408, the authentication system 102 may input the incorrect password into a machine learning model. The machine learning model may be any machine learning model described above in connection with FIGS. 1-3. The machine learning model may have been trained on a dataset that includes input errors made by the user and input errors made by a plurality of other users. For example, the training data may include rows of data with each row including a word, an indication of how the word was input incorrectly, and a label. The label may include an indication of the user that typed the word incorrectly. The indication of how the word was input incorrectly may include the full word that the user input (e.g., including the input mistake). The machine learning model may be trained to output an indication of whether an incorrect word corresponds to the user. Additionally or alternatively, the machine learning model may output a classification indicating which user made the error. In this way, the machine learning model may be able to identify a user based on an incorrect word.

At step 410, the authentication system 102 may generate output indicating whether the incorrect password is a common input error of the user. The output may be generated via the machine learning model. For example, the machine learning model may output an indication of a classification for the incorrect password that was input at step 408. The classification may indicate whether the incorrect password is typical of the user that is being authenticated or whether the incorrect password does not match typical typing mistakes made by the user. The machine learning model may generate output as described above in connection with FIG. 3.

In some embodiments, the output of the machine learning model may include a probability score. The probability score may indicate how confident the machine learning model is that the incorrect password is a typical input mistake of the true owner of an account. For example, the authentication system 102 may determine that the probability score is less than a threshold score. Based on determining that the probability score is less than a threshold score, the authentication system 102 may modify an authentication requirement associated with the user.

In some embodiments, the machine learning model may generate output indicating how close semantically the incorrect authentication input is to the correct authentication input. If the incorrect input and the correct input are close to each other semantically, the authentication system 102 may determine that the incorrect authentication input is a typing mistake of the true user. For example, the output of the machine learning model may include a semantic matching score indicating how close semantically the incorrect authentication input and a corresponding correct authentication input are. In this example, determining that the incorrect authentication input is a typing mistake that corresponds to the user may include, based on the semantic matching score satisfying a threshold score, determining that the incorrect authentication input is a typing mistake that corresponds to the user (e.g., the true user).

At step 412, the authentication system 102 may modify an authentication requirement associated with the user. For example, the authentication system 102 may modify a login requirement associated with the user by temporarily increasing a number of failed attempts that are allowed for password entry for the user. Modifying the authentication requirement may be based on the output indicating that the incorrect password is a common input error of the user. Because the input error is recognized as being associated with the user, the authentication system 102 may ease other authentication requirements because the authentication system 102 has already received an indication that the user that is trying to authenticate is not a malicious actor (e.g., the user trying to authenticate is the true owner of an account, etc.).

In some embodiments, modifying a login requirement associated with the user may include temporarily removing a requirement to answer one or more security questions associated with the user. For example, the authentication system 102 may require the user to answer a security question to authenticate in some cases. Based on determining that the input error is associated with the user, however, the authentication system 102 may allow the user to authenticate without answering the security question. This may enable the user to have a better experience because the user is able to authenticate more easily.

In some embodiments, modifying the authentication requirement may include temporarily increasing a number of failed attempts that are allowed for authentication entry for the user or disregarding the incorrect authentication input as a failed authentication attempt. This may enable the user to have more attempts at logging in or authenticating before the user's account is locked.

In some embodiments, temporarily removing an authentication requirement may mean that the requirement is removed for the next authentication attempt only. Alternatively, temporarily removing a requirement may mean that the requirement is removed for a number of future authentication attempts (e.g., 2, 5, 15, etc.). The number of future authentication attempts may be determined based on how closely the incorrect input matched the user. For example, the machine learning model may generate a score or probability (e.g., a confidence score) indicating how confident the machine learning model is that the incorrect authentication input was made by the user and not a different user (e.g., a malicious actor). If the score is greater than a threshold score, the authentication system 102 may determine to remove the requirement for a greater number of future authentication attempts (e.g., 2) as opposed to a lower number of future authentication attempts (e.g., 1) if the score is lower than the threshold score.

In some embodiments, one or more authentication requirements may be temporarily disabled for a user based on determining that the user is trying to authenticate identity. For example, based on the output indicating that the incorrect password is a common typing error of the user, the authentication system 102 may disable a requirement for two-factor authentication. Based on receiving a correct password (e.g., after the user has typed in an incorrect password that the authentication system 102 has recognized to be a typing mistake corresponding to the user), the authentication system 102 may approve a login of the user without requiring two-factor or multi-factor authentication. For example, the authentication system 102 may remove the requirement for multi-factor authentication based on determining that an incorrect password that has been input is representative of incorrect passwords entered by the owner of an account.

In some embodiments, the authentication system 102 may send a notification to a monitoring system, for example, if input for authentication is determined to not be associated with the correct user (e.g., the input is not associated with a true owner of an account corresponding to the authentication). For example, the authentication system 102 may receive second authentication input comprising a second incorrect authentication input of a user. The authentication system 102 may generate, based on the second incorrect authentication input and via the machine learning model, output indicating that the second incorrect authentication input is not a typing mistake that corresponds to the user (e.g., the true owner of an account, the user that is normally allowed access to a system or location based on authentication, etc.). Based on the output indicating that the second incorrect authentication input is not a typing mistake that corresponds to the user, the authentication system 102 may send a notification to a monitoring system.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
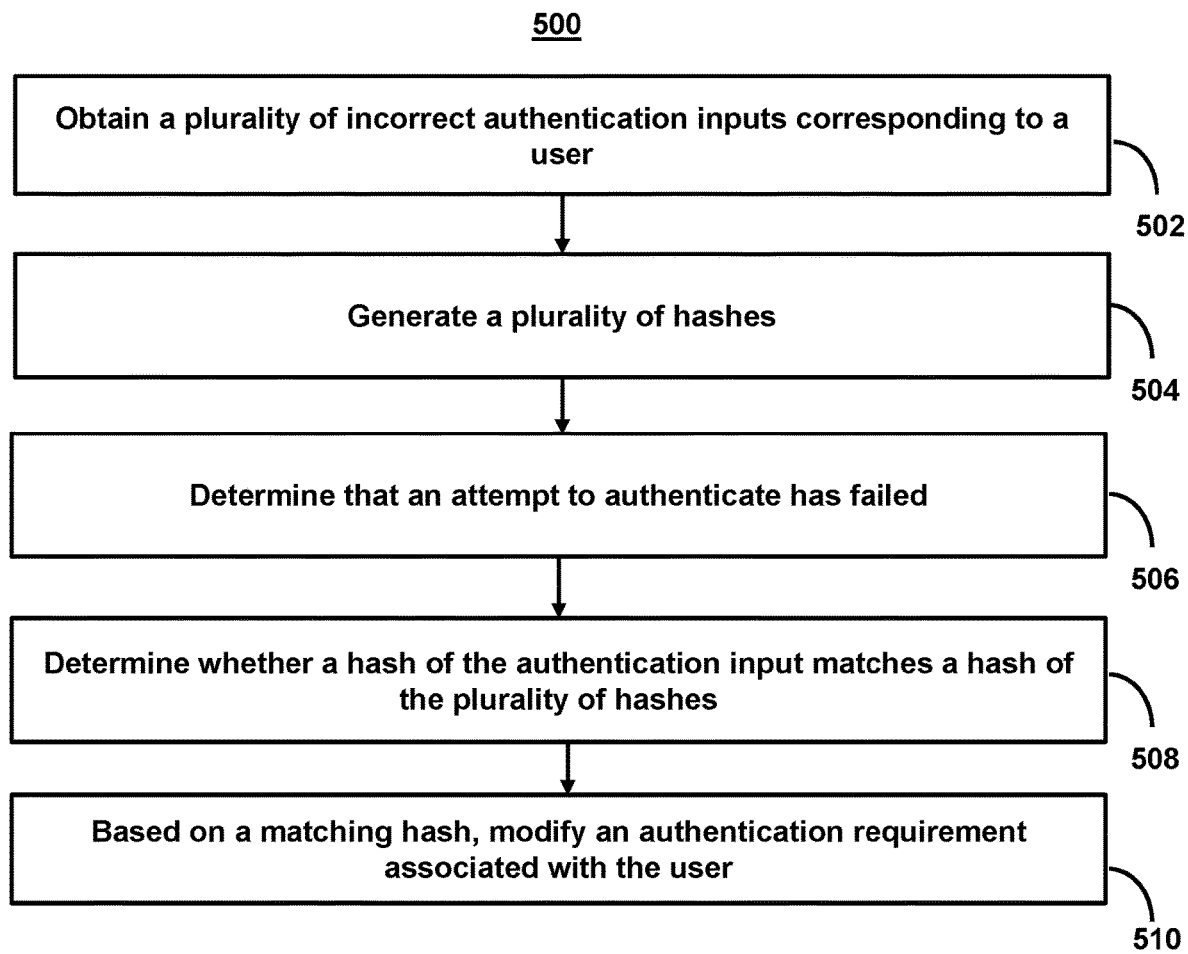
FIG. 5 shows a flowchart of the steps involved in using password error hashes to detect authentication input errors and modify authentication requirements, in accordance with one or more embodiments.

FIG. 5 shows a flowchart of the steps involved in using password error hashes to detect authentication input errors and modify authentication requirements, in accordance with one or more embodiments. For example, the system may use process 500 (e.g., as implemented on one or more system components described above) in order to recognize failed authentications and determine more efficiently whether a malicious actor is attempting to gain access to a system.

At step 502, the authentication system 102 may obtain a plurality of incorrect authentication inputs corresponding to a user. For example, the incorrect authentication inputs may be incorrect passwords that the user has previously typed. The user may be the true owner of an account or a legitimate user that is authorized to access information or a system. Each incorrect authentication input of the plurality of incorrect authentication inputs may include a common typing error of the user.

In some embodiments, the authentication system 102 may ensure that the incorrect authentication inputs are input errors of the user by obtaining them from a trusted device of the user. For example, the incorrect authentication inputs may be obtained via a smartphone that the user has previously indicated is a trusted device of the user.

In some embodiments, the authentication system 102 may use a machine learning model to generate incorrect authentication inputs. The machine learning model may be trained to generate incorrect authentication inputs that the true user is expected to make. The machine learning model may be trained on a dataset comprising typing mistakes made by various users and the characters that were intended to be typed (e.g., or should have been typed) when the typing mistakes were made. The incorrect authentication inputs generated by the machine learning model may be based on other incorrect authentication inputs made by the true user. For example, the authentication system 102 may input the plurality of incorrect authentication inputs into a machine learning model. Based on inputting the plurality of incorrect authentication inputs into the machine learning model, the authentication system 102 may generate, via the machine learning model, output comprising a second plurality of incorrect authentication inputs corresponding to the user.

At step 504, the authentication system 102 may generate a plurality of hashes. The plurality of hashes may be generated based on the plurality of incorrect passwords. For example, each hash of the plurality of hashes may correspond to an incorrect password of the plurality of incorrect passwords. The hashes may be generated using the Secure Hash Standard (e.g., SHA-1, SHA-224, SHA-256, SHA-384, and/or SHA-512), RIPEMD-160 (RACE Integrity Primitives Evaluation Message Digest 160), Whirlpool, or a variety of other techniques. In some embodiments, the plurality of hashes may include hashes corresponding to incorrect authentication input generated by a machine learning model.

At step 506, the authentication system 102 may determine that an attempt to authenticate identity has failed. The authentication attempt may be associated with the user described above in connection with step 502. For example, the authentication system 102 may determine, based on password input of an attempt to login to an account of the user, that the password input is an incorrect password of the user. The attempt at authentication may have been made by the true user or by a different user (e.g., a malicious user). The authentication system 102 may try to determine whether it was the true user or a different user that made the attempt as discussed in more detail below.

At step 508, the authentication system 102 may determine whether a hash of the authentication input matches a hash of the plurality of hashes. The authentication system 102 may generate a hash of the authentication input and compare the hash with one or more hashes generated in step 504. For example, based on determining that the password input is an incorrect password, the authentication system 102 may determine whether a hash corresponding to the password input matches a hash of the plurality of hashes. By doing so, the authentication system 102 may determine whether the incorrect authentication input corresponds to the user (e.g., was made by the true user, is a common typing error of the true user, etc.). If the incorrect authentication input corresponds to the user, the authentication system 102 may avoid the need to notify a monitoring system about potential malicious activity.

In some embodiments, the authentication system 102 may compare a hash of the authentication input with hashes of incorrect authentication input that were generated by a machine learning model (e.g., as described above in connection with step 502). For example, the authentication system 102 may generate, based on a second plurality of incorrect authentication inputs (e.g., that were generated by a machine learning model), a second plurality of hashes. The authentication system 102 may determine whether the hash corresponding to the authentication input matches any hash of the second plurality of hashes. By using additional hashes corresponding to incorrect authentication input generated by a machine learning model, the authentication system 102 may increase its ability to determine whether incorrect authentication input corresponds to a true user or a malicious user.

At step 510, the authentication system 102 may modify an authentication requirement associated with the user. The authentication system 102 may modify an authentication requirement, for example, based on determining that the hash of the authentication input matches a hash of the plurality of hashes. For example, based on the hash of the password input matching the hash of the plurality of hashes, the authentication system 102 may modify a login requirement associated with the user by temporarily disabling a requirement for two-factor authentication. By doing so, the authentication system 102 may provide an improved user experience for the user by enabling easier authentication. This may provide a better user experience without sacrificing computer security because the authentication system 102 is able to determine, based on the authentication input, that the true user is trying to authenticate even if the authentication input is not necessarily the correct authentication input.

In some embodiments, modifying an authentication requirement may include allowing a user to login to an account using a password that is no longer the user's current password. For example, modifying a login requirement may comprise allowing login using a previously created password of the user. The previously created password may be no longer valid. By doing so, the user may have a better user experience. For example, after mistyping the user's current password, the user may mistakenly think that a previous password is the correct password and may try authenticating with the previous password. In this example, the authentication system 102 may authenticate the user even though the current password is not correctly entered.

In some embodiments, modifying the authentication requirement may include increasing a number of failed attempts that are allowed for authentication input. For example, if only five attempts are normally allowed, the authentication system 102 may increase the number of allowed attempts to six or more allowed attempts.

In some embodiments, modifying the authentication requirement may include modifying a security question associated with the user. For example, modifying the authentication requirement may include removing a requirement to answer one or more security questions associated with the user, adding one or more security questions associated with the user to such security question requirement, or other modifications.

In some embodiments, the authentication system 102 may send a notification to a monitoring system, for example, based on the incorrect authentication input not matching incorrect authentication input of the user. For example, the authentication system 102 may receive second authentication input including a second incorrect authentication input of a user. The authentication system 102 may determine that a hash of the second incorrect authentication input does not match any hash of the plurality of hashes. Based on determining that a hash of the second incorrect authentication input does not match any hash of the plurality of hashes, the authentication system 102 may send a notification to a monitoring system. Additionally or alternatively, the authentication system 102 may send a notification to the true user to notify them that an attempt was made to authenticate or log in to the true user's account.

In some embodiments, the authentication system 102 may remove an authentication requirement after receiving both 1) incorrect authentication input corresponding to the user; and 2) the correct authentication input. For example, after receiving incorrect authentication input, the authentication system 102 may receive additional input comprising a correct authentication input. Based on receiving the correct authentication input and based on the hash corresponding to the incorrect authentication input matching the hash of the plurality of hashes, the authentication system 102 may approve a login of the user without requiring one or more other authentication requirements described herein (e.g., two-factor authentication, a CAPTCHA challenge, etc.).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: determining, based on monitoring authentication input, an incorrect authentication input associated with a user; generating, via a prediction model (e.g., a machine learning model configured based on a dataset comprising user input errors associated with the user), an indication of whether the incorrect authentication input is a common user input error for the user; and based on the generated indication indicating that the incorrect authentication input is a common user input error for the user, modifying an authentication requirement associated with the user.
2. The method of the preceding embodiment, wherein modifying the authentication requirement comprises temporarily increasing a number of failed attempts that are allowed for authentication entry for the user or disregarding the incorrect authentication input as a failed authentication attempt.
3. The method of any of the preceding embodiments, wherein the generated indication comprises a semantic matching score between the incorrect authentication input and a corresponding correct authentication input, and wherein determining that the incorrect authentication input is a typing mistake that corresponds to the user comprises: based on determining that the semantic matching score satisfies a threshold score, determining that the incorrect authentication input is a typing mistake that corresponds to the user.
4. The method of any of the preceding embodiments, wherein modifying the authentication requirement comprises temporarily removing a requirement to answer one or more security questions associated with the user.
5. The method of any of the preceding embodiments, further comprising: receiving second authentication input comprising a second incorrect authentication input of a user; generating, based on the second incorrect authentication input and via the model, output indicating that the second incorrect authentication input is not a typing mistake that corresponds to the user; and based on the output indicating that the second incorrect authentication input is not a typing mistake that corresponds to the user, sending a notification to a monitoring system.
6. The method of any of the preceding embodiments, wherein modifying the authentication requirement associated with the user comprises disabling a requirement for two-factor authentication.
7. The method of any of the preceding embodiments, further comprising: receiving input comprising a correct authentication input; and based on receiving the correct authentication input and based on determining that the incorrect authentication input is a typing mistake that corresponds to the user, authenticating the user without requiring two-factor authentication.
8. The method of any of the preceding embodiments, wherein the generated indication comprises a probability score and modifying the authentication requirement associated with the user comprises: determining that the probability score is less than a threshold score; and based on determining that the probability score is less than a threshold score, modifying the authentication requirement associated with the user.
9. A method comprising: determining, based on authentication input associated with a user, that the authentication input comprises an input error associated with the user; based on determining that the authentication input comprises an input error associated with the user, determining whether a value corresponding to the authentication input matches a value of a plurality of values; and based on the value corresponding to the authentication input matching the value of the plurality of values, modifying a login requirement associated with the user.

10. The method of any of the preceding embodiments, further comprising: inputting the plurality of incorrect authentication inputs into a machine learning model; and generating, via the machine learning model, output comprising a second plurality of incorrect authentication inputs corresponding to the user.

11. The method of any of the preceding embodiments, wherein determining whether the hash corresponding to the incorrect authentication input matches the hash of the plurality of hashes comprises: generating, based on the second plurality of incorrect authentication inputs, a second plurality of hashes; and determining whether the hash corresponding to the authentication input matches the second plurality of hashes.

12. The method of any of the preceding embodiments, wherein modifying the login requirement associated with the user further comprises: modifying the login requirement by allowing login using a previous authentication input of the user.

13. The method of any of the preceding embodiments, wherein modifying the login requirement comprises increasing a number of failed attempts that are allowed for authentication input.

14. The method of any of the preceding embodiments, wherein modifying the login requirement comprises removing a requirement to answer one or more security questions associated with the user.

15. The method of any of the preceding embodiments, further comprising: receiving second authentication input comprising a second incorrect authentication input of a user; determining that a hash of the second incorrect authentication input does not match any hash of the plurality of hashes; and based on determining that a hash of the second incorrect authentication input does not match any hash of the plurality of hashes, sending a notification to a monitoring system.

16. The method of any of the preceding embodiments, further comprising: receiving additional input comprising a correct authentication input; and based on receiving the correct authentication input and based on the hash corresponding to the authentication input matching the hash of the plurality of hashes, approving a login of the user without requiring two-factor authentication.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A computer security and machine learning system for monitoring password entry and modifying login requirements based on detection of user-specific typing errors, the system comprising:
one or more processors programmed with computer program instructions that, when executed by the one or more processors, cause operations comprising:
detecting a password field has input focus of a user device associated with a user;
based on detecting the password field has input focus, monitoring the password field for input of the user;
determining, based on monitoring the password field, that the input is an incorrect password of the user;
inputting the incorrect password into a machine learning model that has been trained on a dataset comprising typing errors made by a plurality of other users and typing errors made by the user;
generating, via the machine learning model, output indicating whether the incorrect password is a common typing error of the user; and
based on the output indicating that the incorrect password is a common typing error of the user, modifying a login requirement associated with the user by temporarily increasing a number of failed attempts that are allowed for password entry for the user.

2. The system of claim 1, wherein modifying the login requirement associated with the user further comprises temporarily removing a requirement to answer one or more security questions associated with the user.

3. The system of claim 1, wherein the instructions, when executed cause operations further comprising:
based on the output indicating that the incorrect password is a common typing error of the user, disabling a requirement for two-factor authentication; and
based on receiving a correct password, approving a login of the user without requiring two-factor authentication.

4. The system of claim 1, wherein the output comprises a probability score and modifying the login requirement associated with the user comprises:
determining that the probability score is less than a threshold score; and
based on determining that the probability score is less than a threshold score, modifying the login requirement associated with the user.

5. A method comprising:
determining, based on monitoring authentication input, an incorrect authentication input associated with a user;
inputting the incorrect authentication input into a machine learning model that has been trained on a dataset comprising user input errors associated with the user;
generating, via the machine learning model, output indicating whether the incorrect authentication input is a common user input error for the user; and
based on the output indicating that the incorrect authentication input is a common user input error for the user, modifying an authentication requirement associated with the user.

6. The method of claim 5, wherein modifying the authentication requirement comprises temporarily increasing a number of failed attempts that are allowed for authentication entry for the user or disregarding the incorrect authentication input as a failed authentication attempt.

7. The method of claim 5, wherein the output comprises a semantic matching score between the incorrect authentication input and a corresponding correct authentication input, and wherein determining that the incorrect authentication input is a typing mistake that corresponds to the user comprises:

based on determining that the semantic matching score satisfies a threshold score, determining that the incorrect authentication input is a typing mistake that corresponds to the user.

8. The method of claim 5, wherein modifying the authentication requirement comprises temporarily removing a requirement to answer one or more security questions associated with the user.

9. The method of claim 5, further comprising:
receiving second authentication input comprising a second incorrect authentication input of a user;
generating, based on the second incorrect authentication input and via the machine learning model, output indicating that the second incorrect authentication input is not a typing mistake that corresponds to the user; and
based on the output indicating that the second incorrect authentication input is not a typing mistake that corresponds to the user, sending a notification to a monitoring system.

10. The method of claim 5, wherein modifying the authentication requirement associated with the user comprises disabling a requirement for multi-factor authentication.

11. The method of claim 10, further comprising:
receiving input comprising a correct authentication input; and
based on receiving the correct authentication input and based on determining that the incorrect authentication input is a typing mistake that corresponds to the user, authenticating the user without requiring multi-factor authentication.

12. The method of claim 5, wherein the output comprises a probability score and modifying the authentication requirement associated with the user comprises:
determining that the probability score is less than a threshold score; and
based on determining that the probability score is less than a threshold score, modifying the authentication requirement associated with the user.

13. A non-transitory, computer-readable medium comprising instructions that when executed by one or more processors, causes operations comprising:
determining, based on monitoring authentication input, an incorrect authentication input associated with a user;
inputting the incorrect authentication input into a machine learning model that has been trained on a dataset comprising user input errors associated with the user;
generating, via the machine learning model, output indicating whether the incorrect authentication input is a common user input error for the user; and
based on the output indicating that the incorrect authentication input is a common user input error for the user, modifying an authentication requirement associated with the user.

14. The medium of claim 13, wherein modifying the authentication requirement comprises temporarily increasing a number of failed attempts that are allowed for authentication entry for the user or disregarding the incorrect authentication input as a failed authentication attempt.

15. The medium of claim 13, wherein the output comprises a semantic matching score between the incorrect authentication input and a corresponding correct authentication input, and wherein determining that the incorrect authentication input is a typing mistake that corresponds to the user comprises:
based on determining that the semantic matching score satisfies a threshold score, determining that the incorrect authentication input is a typing mistake that corresponds to the user.

16. The medium of claim 13, wherein modifying the authentication requirement comprises temporarily removing a requirement to answer one or more security questions associated with the user.

17. The medium of claim 13, further comprising:
receiving second authentication input comprising a second incorrect authentication input of a user;
generating, based on the second incorrect authentication input and via the machine learning model, output indicating that the second incorrect authentication input is not a typing mistake that corresponds to the user; and
based on the output indicating that the second incorrect authentication input is not a typing mistake that corresponds to the user, sending a notification to a monitoring system.

18. The medium of claim 13, wherein modifying the authentication requirement associated with the user comprises disabling a requirement for multi-factor authentication.

19. The medium of claim 18, further comprising:
receiving input comprising a correct authentication input; and
based on receiving the correct authentication input and based on determining that the incorrect authentication input is a typing mistake that corresponds to the user, authenticating the user without requiring multi-factor authentication.

20. The medium of claim 13, wherein the output comprises a probability score and modifying the authentication requirement associated with the user comprises:
determining that the probability score is less than a threshold score; and
based on determining that the probability score is less than a threshold score, modifying the authentication requirement associated with the user.

* * * * *